(12) United States Patent
Pelto-Huikko

(10) Patent No.: US 10,280,039 B2
(45) Date of Patent: May 7, 2019

(54) ROPE TERMINAL ASSEMBLY AND AN ELEVATOR

(71) Applicant: Raimo Pelto-Huikko, Vantaa (FI)

(72) Inventor: Raimo Pelto-Huikko, Vantaa (FI)

(73) Assignee: Kone Corporation, Helsinki (FI)

( * ) Notice: Subject to any disclaimer, the term of this patent is extended or adjusted under 35 U.S.C. 154(b) by 815 days.

(21) Appl. No.: 14/513,413

(22) Filed: Oct. 14, 2014

(65) Prior Publication Data
US 2015/0151948 A1  Jun. 4, 2015

(30) Foreign Application Priority Data
Nov. 29, 2013  (EP) .................................. 13195084

(51) Int. Cl.
| | | |
|---|---|---|
| B66B 7/08 | (2006.01) | |
| B66B 9/00 | (2006.01) | |
| F16G 11/04 | (2006.01) | |
| F16G 11/06 | (2006.01) | |
| B66B 7/06 | (2006.01) | |

(52) U.S. Cl.
CPC ................ B66B 7/085 (2013.01); B66B 9/00 (2013.01); F16G 11/048 (2013.01); F16G 11/06 (2013.01); B66B 7/062 (2013.01)

(58) Field of Classification Search
CPC ........ F16G 11/04; F16G 11/048; F16G 11/06; B66B 7/08; B66B 7/085; B66B 9/00
USPC .................................. 24/19, 268, 270, 136 L
See application file for complete search history.

(56) References Cited

U.S. PATENT DOCUMENTS

| 4,845,814 A * | 7/1989 | Crook .................... F16G 11/048 24/135 R |
| 7,506,728 B2 * | 3/2009 | Hawkes ................. B66B 7/1223 187/277 |
| 7,681,934 B2 * | 3/2010 | Harada ..................... B66C 1/12 294/74 |

(Continued)

FOREIGN PATENT DOCUMENTS

| CN | 1926051 A | 3/2007 |
| CN | 102282088 A | 12/2011 |

(Continued)

OTHER PUBLICATIONS

European Search Report for Application No. EP 13195084 dated Apr. 15, 2014.

(Continued)

*Primary Examiner* — Michael A Riegelman
(74) *Attorney, Agent, or Firm* — Harness, Dickey & Pierce, P.L.C.

(57) ABSTRACT

The invention relates to a rope terminal assembly of an elevator fixing an elevator rope to a fixing base such as an elevator unit, said elevator being suitable for transporting passengers and/or goods, said assembly comprising an elevator rope, whose width is larger than its thickness in a rope transverse direction, with at least one end comprising a first member with a first end face and a second member with a second end face, a wedge element, a wedge housing, the rope terminal assembly comprising a rope gap through which said elevator rope passes and said wedge element is arranged to wedge between the first member with the first end face and the second member with the second end face of the elevator rope thus locking said elevator rope in the gap, and an elevator.

10 Claims, 3 Drawing Sheets

(56) References Cited

U.S. PATENT DOCUMENTS

| | | | |
|---|---|---|---|
| 8,011,479 B2 * | 9/2011 | Stucky | B66B 7/1223 187/391 |
| 8,505,173 B2 * | 8/2013 | Pitts | B66B 7/085 24/136 R |
| 2001/0040039 A1 * | 11/2001 | De Angelis | B66B 7/1223 174/74 R |
| 2002/0000346 A1 * | 1/2002 | Baranda | B66B 7/06 187/254 |
| 2002/0042973 A1 * | 4/2002 | Rivera | B66B 7/085 24/115 R |
| 2002/0076274 A1 * | 6/2002 | Carlsen | F16G 11/048 403/314 |
| 2003/0041419 A1 * | 3/2003 | Perez | B66B 7/085 24/136 R |
| 2004/0206579 A1 * | 10/2004 | Baranda | B66B 7/06 187/254 |
| 2006/0054468 A1 * | 3/2006 | Ach | B66B 7/085 198/844.2 |
| 2008/0061572 A1 | 3/2008 | Harada et al. | |
| 2008/0282512 A1 * | 11/2008 | Ach | B66B 7/085 24/136 R |
| 2009/0307876 A1 * | 12/2009 | Pitts | B66B 7/085 24/136 R |
| 2011/0000746 A1 * | 1/2011 | Pelto-Huikko | B66B 7/062 187/254 |
| 2011/0100759 A1 * | 5/2011 | Yu | B66B 7/062 187/251 |
| 2011/0220438 A1 * | 9/2011 | Annen | B66B 7/062 187/251 |
| 2013/0062146 A1 * | 3/2013 | Nolting | B66B 7/062 187/251 |
| 2014/0182975 A1 * | 7/2014 | Ikonen | B66B 5/0031 187/251 |
| 2014/0230194 A1 * | 8/2014 | Moeschen-Siekmann | F16G 3/00 24/115 H |
| 2014/0305744 A1 * | 10/2014 | Kere | B66B 7/1238 187/254 |
| 2014/0345978 A1 * | 11/2014 | Alasentie | B66B 7/064 174/70 R |
| 2015/0101889 A1 * | 4/2015 | Kere | B66B 7/085 187/254 |
| 2015/0307323 A1 * | 10/2015 | Zapf | B66B 7/062 187/411 |
| 2016/0185572 A1 * | 6/2016 | Lehtinen | F16G 11/044 187/411 |
| 2016/0207739 A1 * | 7/2016 | Pelto-Huikko | B66B 9/00 |
| 2016/0272466 A1 * | 9/2016 | Helenius | B66B 5/0031 |
| 2017/0036891 A1 * | 2/2017 | Lehtinen | B66B 7/085 |
| 2017/0121149 A1 * | 5/2017 | Lehtinen | B66B 19/02 |
| 2017/0217730 A1 * | 8/2017 | Helenius | B66B 7/085 |
| 2018/0111795 A1 * | 4/2018 | Dudde | B66B 7/085 |

FOREIGN PATENT DOCUMENTS

| | | | | |
|---|---|---|---|---|
| DE | 102007031092 A1 | | 1/2009 | |
| FR | 1464003 A | * | 7/1966 | F16G 11/04 |
| GB | 2255354 A | | 11/1992 | |
| WO | WO 2009003815 A1 | * | 1/2009 | B66B 7/085 |
| WO | WO 2011098847 A1 | * | 8/2011 | B66B 7/062 |
| WO | WO 2013153016 A1 | * | 10/2013 | B66B 5/0006 |

OTHER PUBLICATIONS

Chinese Office Action dated Feb. 1, 2018 issued in corresponding Chinese Application No. 20140659181.9 (with English Translation).

* cited by examiner

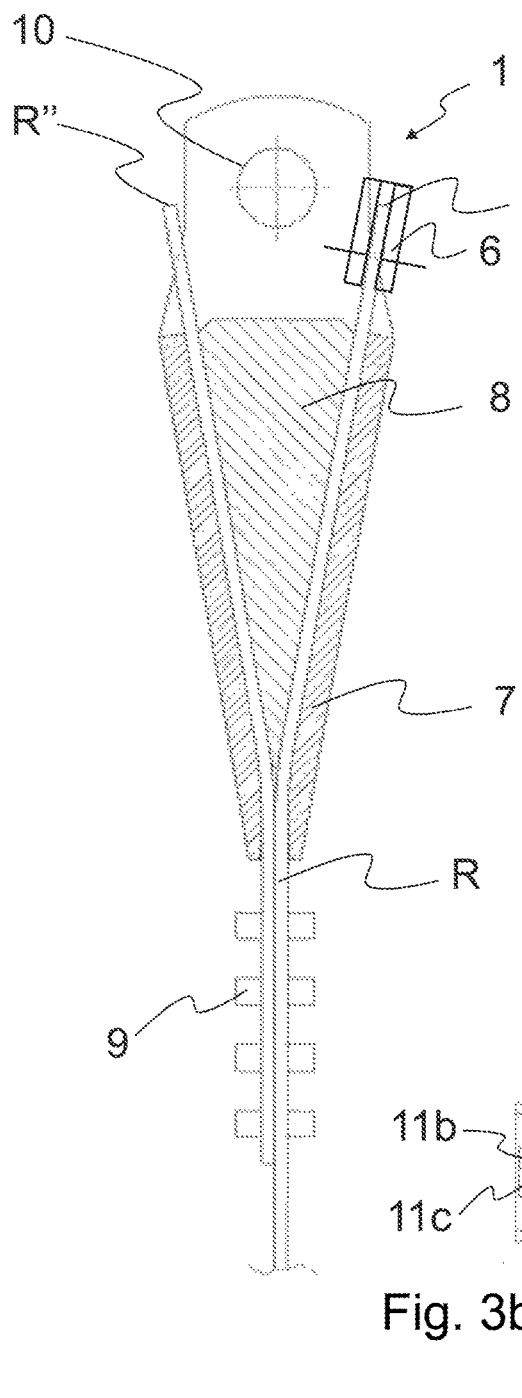
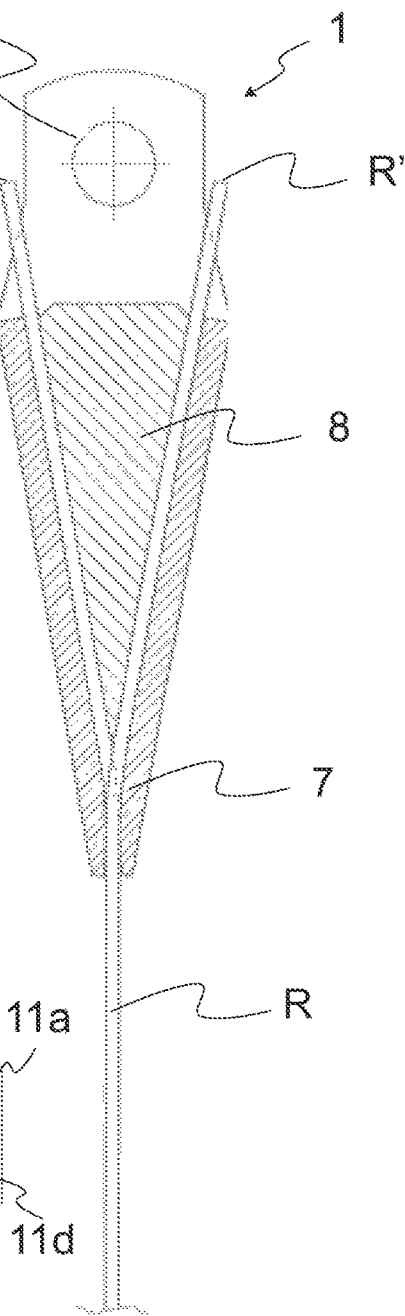

ROPE TERMINAL ASSEMBLY AND AN ELEVATOR

This application claims priority to European Patent Application No. EP13195084 filed on Nov. 29, 2013, the entire contents of which are incorporated herein by reference.

FIELD OF THE INVENTION

The object of the invention is a rope terminal assembly of an elevator, the elevator being suitable for transporting passengers and/or goods, and an elevator.

BACKGROUND OF THE INVENTION

In elevator systems, elevator roping is used for suspending and/or moving an elevator car, a counterweight or both. In modern elevators lightweight suspension roping is used, where the elevator roping comprises plural belt-type ropes where the width of the rope is larger than its thickness in a transverse direction of the rope. The rope comprises a load-bearing part made of composite materials, which composite materials comprise non-metallic reinforcing fibers in polymer matrix material. The structure and choice of material make it possible to achieve lightweight elevator ropes having a thin construction in the bending direction, a good tensile stiffness and tensile strength in longitudinal direction. In addition, the rope structure remains substantially unchanged at bending, which contributes towards a long service life.

Several arrangements have been presented to provide tools for attaching elevator ropes with the elevator units. With non-metallic elevator ropes, particularly with elevator ropes made of fiber-reinforced polymer composite materials, it is challenging to make mechanical attachment with the elevator unit without causing damage in the elevator rope.

Rope terminal assembly is traditionally constructed from metallic materials, such as steel, with two wedge elements. The drawback of this kind of elevator rope terminal assembly is that the contact surfaces of the wedge element are different with different friction coefficients on different sides of the wedge element. The different wedge element contact surfaces with different friction coefficients are not optimal from mechanical behavior point of view.

Furthermore, the elevator roping typically comprises plural ropes, which makes the number of rope terminals needed numerous and hence heavy weight and the production of large amounts of complicated rope terminal products, especially on assembly lines, costly. It would be advantageous if the elevator rope terminal assembly could be formed as simple as possible with only one wedge element. There is thus a growing need for a cost effective and reliable elevator rope terminal assembly comprising also a connection to the rope condition monitoring means of an elevator.

BRIEF DESCRIPTION OF THE INVENTION

The object of the invention is to introduce an improved rope terminal assembly and an elevator. The object of the invention is, inter alia, to solve drawbacks of known solutions and problems discussed later in the description of the invention. It is also an object to allow a lightweight, cost-effective and reliable rope terminal assembly with a faster manufacturing and installation process. The object of the invention is to provide a rope terminal assembly with improved quality of manufacturing and installation for the elevator ropes comprising polymer composite materials.

Embodiments are presented which, inter alia, facilitate a simple, safe and efficient rope terminal manufacturing process and a rope terminal assembly with connection to damage detection of non-metallic load bearing parts in said elevator ropes. Also, embodiments are presented, where the rope terminal assembly enables the production of large amounts of rope terminal products, especially on assembly lines of rope terminals in a cost-effective way.

It is brought forward a new rope terminal assembly of an elevator fixing an elevator rope to a fixing base such as an elevator unit, said elevator being suitable for transporting passengers and/or goods, said assembly comprising an elevator rope, whose width is larger than its thickness in a rope transverse direction, with at least one end comprising a first member with a first end face and a second member with a second end face, a wedge element, and a wedge housing. The rope terminal assembly comprises a rope gap through which said elevator rope passes and said wedge element is arranged to wedge between the first member with the first end face and the second member with the second end face of the elevator rope thus locking said elevator rope in the gap.

In a preferred embodiment, the elevator rope of the rope terminal assembly comprises a second member with the second end face comprising a separate piece of predetermined length of said elevator rope.

In a preferred embodiment, the elevator rope of the rope terminal assembly comprises a first member with the first end face and a second member with the second end face which members are formed by splitting the rope end of said elevator rope.

In a preferred embodiment, the elevator rope of the rope terminal assembly comprises a first member with the first end face and a second member with the second end face each of which members comprise one or more non-metallic, such as carbon-fiber-reinforced polymer composite load bearing parts.

In a preferred embodiment, the rope terminal assembly comprises the elevator rope comprising non-metallic, such as carbon-fiber-reinforced polymer composite load bearing parts placed on opposite sides of the wedge element.

In a preferred embodiment, the rope terminal assembly comprises the elevator rope comprising non-metallic, such as carbon-fiber-reinforced polymer composite load bearing parts where the outermost load bearing parts are placed on opposite side of the wedge element than the innermost load bearing parts.

In a preferred embodiment, the rope terminal assembly comprises the elevator rope comprising non-metallic, such as carbon-fiber-reinforced polymer composite load bearing parts separated from each other by splitting the coating into branches accommodating the wedge element.

In a preferred embodiment, the elevator rope comprises a second member with the second end face of said elevator rope comprising a separate piece of predetermined length of said elevator rope clamped to the elevator rope with clamps.

In a preferred embodiment, the rope terminal assembly comprises a wedge element being an elongated element comprising a contact surface portion arranged against the first member with the first end face of said elevator rope and a contact surface portion arranged against the second member with the second end face of said elevator rope. The wedge element may comprise a smooth contact surface portion or a rough or patterned contact surface portion, depending on the elevator rope surface. In one embodiment, both wedge contact surface portions have equal contact surfaces with equal friction properties. The wedge element may also comprise a space for the rope end block at the first end of the wedge element. The wedge element is advantageously made of metal or of some other mechanically suitable material.

In a preferred embodiment, the rope terminal assembly comprises the wedge housing which is symmetrical with respect to the longitudinal axis of said wedge housing, the longitudinal axis of said wedge housing being essentially the longitudinal direction of the rope.

In a preferred embodiment, the rope terminal assembly comprises a rope end block attached to said rope end, and said rope end block is attached on the first end face side of the elevator rope with respect to the wedge element. The elevator rope is electrically connected to a rope condition monitoring means via the rope end block comprising one or more electrically conductive short circuit elements and fastening means. Thus also safety of the rope terminal assembly is improved.

In a preferred embodiment, the rope terminal assembly comprises a rope end block having first part on a first side of said elevator rope and a second part on a second side of said elevator rope.

In a preferred embodiment, the rope terminal assembly comprises a rope end block extending over said end face of said elevator rope.

In a preferred embodiment, the rope terminal assembly comprises a rope end block of a single piece structure where said first part and a second part of said rope end block are connected with a middle part of said rope end block.

In a preferred embodiment, the rope terminal assembly comprises a rope end block made of plastics or some other electrically non-conductive material.

In a preferred embodiment, the rope terminal assembly comprises an elevator rope electrically connected to a rope condition monitoring means via said rope end block comprising one or more electrically conductive short circuit elements and fastening means.

In a preferred embodiment, the rope terminal assembly comprises an elevator rope comprising non-metallic material, such as carbon-fiber-reinforced polymer composite material.

In a preferred embodiment, the rope terminal assembly comprises an elevator rope comprising one or more fiber-reinforced polymer composite load-bearing parts coated with elastomeric material, such as polyurethane or substantially polyurethane based material or silicon or substantially silicon based material. The aforementioned coating provides a medium for transmitting external forces to the load bearing members and a protection for the load bearing members.

In a preferred embodiment, the rope terminal assembly comprises an elevator rope comprising non-metallic, such as carbon-fiber-reinforced polymer composite load bearing parts to which rope condition monitoring means are connected with electrically conductive fastening means.

In a preferred embodiment, elevator ropes with continuous unidirectional untwisted carbon-fiber-reinforced polymer composite load bearing parts are fixed to the elevator unit with said rope terminal assembly and electrical rope condition monitoring means are connected to the rope via said rope end block of the rope terminal assembly. For unidirectional carbon-fiber-reinforced polymer composites, the longitudinal electrical resistance of unidirectional fiber is much lower than the transverse resistance, and the damage in the composite material can be detected by measuring the one or the other. Electrical resistance is a good damage sensor for carbon/epoxy laminates, especially for the detection of fiber breakage.

In a preferred embodiment, the elevator roping comprises at least one rope comprising at least one load-bearing member made of carbon-fiber-reinforced polymer composite material. In a preferred embodiment, each of said at least one load bearing member has width greater than thickness thereof in the width-direction of the rope. In particular, it is preferable that each of said at least one rope is in the form of a belt. Large width makes it well suitable for elevator use as bending of the rope is necessary in most elevators. The rope, in particular the load bearing member(s) thereof, can in this way be given a large cross-sectional area, which facilitates feasible dimensioning of the stiffness of the roping.

In a preferred embodiment, the rope terminal assembly is used in elevators with counterweight, however as well being applicable in elevators without counterweight. In addition, it can also be used in conjunction with other hoisting machines, e.g. as a crane suspension and/or transmission rope. The low weight of the rope provides an advantage especially in acceleration situations, because the energy required by changes in the speed of the rope depends on its mass. The low weight further provides an advantage in rope systems requiring separate compensating ropes, because the need for compensating ropes is reduced or eliminated altogether. The low weight also allows easier handling of the ropes.

In a preferred embodiment of an elevator, the rope terminal assembly according to the invention is used to fix an elevator rope to a fixing base such as the elevator unit or the end of a hoistway. The elevator has been arranged to comprise a hoistway, and an elevator unit movable in the hoistway, the elevator unit being an elevator car for transporting passengers and/or goods. The elevator arrangement may also comprise other movable elevator units such as the counterweight, as depicted. The elevator comprises lifting means comprising a lifting device, one or more suspension and/or transmission ropes, each said rope comprising one or more load bearing parts, attached with the rope terminal assembly at least to one elevator unit.

In a preferred embodiment each rope is guided to pass over the traction sheave rotated by the hoisting machine of the elevator and one ore more diverting pulleys. As the hoisting machine rotates, the traction sheave at the same time moves the elevator car and the counterweight in the up direction and down direction, respectively, due to friction. In addition, in high-rise buildings and in high-speed elevators there are one or more compensating ropes, each compensating rope being attached at its first end to the bottom end of the counterweight and at its second end to the bottom part of the elevator car, either to the car sling or to the car itself. The compensating rope is kept taut, e.g. by means of compensating pulleys, under which the compensating rope passes around and which pulleys are supported to a support structure on the base of the elevator hoistway. A travelling cable intended for the electricity supply of the elevator car and/or for data traffic, is attached at its first end to the elevator car, e.g. to the bottom part of the elevator car, and at its second end to a connection point on the wall of the elevator hoistway, which connection point is typically at the point of the midpoint or above the midpoint of the height direction of the elevator hoistway.

In a preferred embodiment, the elevator comprises rope condition monitoring means comprising an elevator rope electrically connected to a rope condition monitoring means via said rope end block comprising one or more electrically conductive short circuit elements and fastening means, a rope condition monitoring device, which monitors and transmits an electrical signal of said elevator rope, at predefined time intervals, preferably at least once per second, to an elevator controller. If an error signal is transmitted from said rope condition monitoring means to an elevator controller, the elevator operation is altered or the elevator is taken out of service. In a preferred embodiment, the rope condition monitoring means comprise a current source, a voltage measurement device, a microcontroller, and a display for monitoring condition of said ropes.

In a preferred embodiment, the rope end block is manufactured from plastics or some other electrically non-conductive material. Preferably rope end block is a single piece structure manufactured from plastics, such as from thermoplastics polymer, for instance polyethylene, polypropylene, polystyrene or polyvinyl chloride, or thermosetting polymer, for instance polyester, polyurethanes or epoxy resins. The rope end block may be reinforced by glass, carbon or aramid fibers, and the reinforcing fibers may by short cut or they may be continuous fibers. Hence the mechanical properties, particularly specific strength and stiffness of the rope end block are improved. The rope end block is preferably manufactured by extrusion, pultrusion, injection molding, blow molding, thermoforming, rotational molding, casting, foaming, compression molding or transfer molding, for instance. Thus the manufacturing of rope end block pieces is fast and the manufacturing costs are lower. Said rope end block pieces may also be manufactured from re-cycled plastics or other re-cycled materials.

In a preferred embodiment, the rope end block comprises a first frame portion attached to the elevator rope end. The rope end block is attached to said elevator rope end with fastening means. It is thus possible for the fastening means to pass through the openings in the first frame portion of the rope end block. The fastening means can advantageously be made of metal or of some other suitable electrically conductive material. The fastening means are advantageously screws or bolts with nuts. Fastening to the rope can be done by drilling bores in the rope and fastening with screws or bolts.

In a preferred embodiment, the rope end block comprises one or more short circuit elements attached to said rope end block with fastening means. It is thus possible for the fastening means to pass through the openings in the short circuit elements. The short circuit elements as well as the fastening means are advantageously made of metal or of some other suitable electrically conductive material. The fastening means are advantageously screws or bolts. The fastening to the rope is done by drilling bores in the rope and fastening with screws or bolts. The fastening means for attaching short circuit elements are advantageously the same screws or bolts used to attach the rope end block to the rope. In a preferred embodiment, the short circuit elements are metallic short circuit plates. In case of four load-bearing parts, the rope is electrically modeled as four resistors. Preferred solution is to measure one rope as a single resistance. In that way measuring arrangements are kept simple and the method is also more reliable, because the number of wires and connections is minimized. With this method simple and reliable solutions to short-circuit carbon-fiber-reinforced polymer composite load-bearing parts, and to connect the measuring wires to the rope, preferably by self-tapping screws screwed between the load-bearing parts in such a way, that the screw acts as an electrically conductive path between adjacent load-bearing parts, are used. At the counterweight end of said rope, preferably three screws are used to short-circuit all of the strands. At the car end of said rope, preferably two outermost load-bearing parts are connected together, and measuring wires are inserted under these two screws with a split ring connector. With this arrangement, all carbon-fiber-reinforced polymer load-bearing parts are monitored and the whole rope is seen as a single resistor.

In a preferred embodiment, the wedge housing comprises two elongated side portions and two elongated wedge support portions. The side portions of the wedge housing may be separate pieces attached by welding together or the side portions may be one piece of structure of predetermined size. The rope terminal assembly is fixed to the fixing base with a fixing rod being fixed to said wedge housing side elements with fixing means. It is possible for the fixing means of the fixing rod to pass through the openings in the wedge housing side elements.

In a preferred embodiment of the invention, at least one rope, but preferably a number of suspension and/or transmission ropes is constructed such that the width of the rope is larger than its thickness in a transverse direction of the rope and fitted to support and move an elevator car, said rope comprising a load-bearing part made of composite material, which composite material comprises non-metal reinforcing fibers such as unidirectional carbon-fiber, in a polymer matrix. The suspension rope is most preferably secured by one end to the elevator car and by the other end to a counterweight, but it is applicable for use in elevators without counterweight as well. Although the figures only show elevators with a 1:1 suspension ratio, the rope described is also applicable for use as a suspension rope in an elevator with a 1:2 suspension ratio. The rope is particularly well suited for use as a suspension rope in an elevator having a large lifting height, preferably an elevator having a lifting height of over 100 meters, most preferably 150-800 meters. The rope defined can also be used to implement a new elevator without a compensating rope, or to convert an old elevator into one without a compensating rope.

It is obvious to a person skilled in the art that the invention is not exclusively limited to the embodiments described above, in which the invention has been described by way of example, but that many variations and different embodiments of the invention are possible within the scope of the inventive concept defined in the claims presented below. Thus it is obvious that the ropes described may be provided with a cogged surface or some other type of patterned surface to produce a positive contact with the traction sheave. It is also obvious that the rectangular composite load-bearing parts may comprise edges more starkly rounded than those illustrated or edges not rounded at all.

Similarly, the polymer layer of the ropes may comprise edges/corners more starkly rounded than those illustrated or edges/corners not rounded at all. It is likewise obvious that the load-bearing part/parts in the embodiments can be arranged to cover most of the cross-section of the rope. In this case, the sheath-like polymer layer surrounding the load-bearing part/parts is made thinner as compared to the thickness of the load-bearing part, in the thickness-wise direction of the rope. It is likewise obvious that, in conjunction with the solutions represented, it is possible to use belts of other types than those presented. It is likewise obvious that both carbon-fiber and glass fiber can be used in the same composite part if necessary. It is likewise obvious that the thickness of the polymer layer may be different from that described. It is likewise obvious that the shear-resistant part could be used as an additional component with any other rope structure showed in this application. It is likewise obvious that the matrix polymer in which the reinforcing fibers are distributed may comprise—mixed in the basic matrix polymer, such as e.g. epoxy—auxiliary materials, such as e.g. reinforcements, fillers, colors, fire retardants, stabilizers or corresponding agents. It is likewise obvious that, although the polymer matrix preferably does not consist of elastomer, the invention can also be utilized using an elastomer matrix. It is also obvious that the fibers have been subjected to sizing or any other surface treatment to improve adhesion to thermoset and to some thermoplastic resins and to protect the fibers. It is also obvious that the fibers need not necessarily be round in cross-section, but they may have some other cross-sectional shape. It is further obvious that auxiliary materials, such as e.g. reinforcements, fillers, colors, fire retardants, stabilizers or corresponding agents, may be mixed in the basic polymer of the layer, e.g. in polyurethane. It is likewise obvious that the invention can also be applied in elevators designed for hoisting heights other than those considered above.

The elevator as describe anywhere above is preferably, but not necessarily, installed inside a building. The car is preferably traveling vertically. The car is preferably arranged to serve two or more landings. The car preferably responds to calls from landing and/or destination commands from inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which

FIG. 2 illustrates schematically a preferred embodiment of the rope terminal assembly with one wedge element.

FIG. 3a illustrates schematically an alternative preferred embodiment of the rope terminal assembly with one wedge element.

FIG. 3b illustrates a cross-section of an alternative preferred embodiment of the rope terminal assembly with one wedge element.

DETAILED DESCRIPTION

Figure 1:
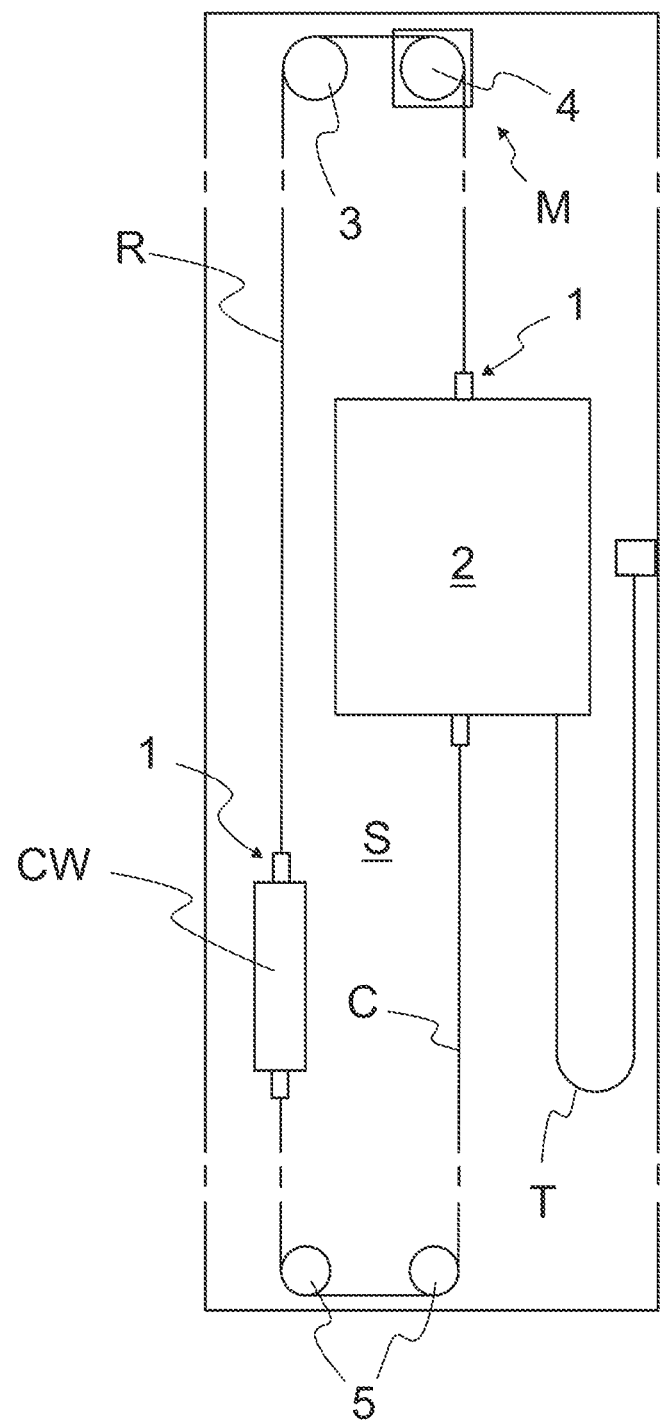
FIG. 1 illustrates schematically an elevator according to an embodiment of the invention.

FIG. 1 illustrates a preferred embodiment of an elevator where the elevator rope R, C is connected to the elevator unit 2, CW with a rope terminal assembly 1 according to the invention. The elevator comprises at least a hoistway S and an elevator unit 2 movable in the hoistway S, the elevator unit being an elevator car 2 for transporting passengers and/or goods. The elevator arrangement may also comprise other movable elevator units such as the counterweight CW, as depicted. Furthermore, the elevator comprises lifting means comprising a lifting device M, roping comprising one or more suspension and transmission ropes R, each rope R comprising one or more load bearing members 11a-d, 12a-b, 13, and being attached with the rope terminal assembly 1 at least to one elevator unit 2, CW. Each rope R is guided to pass over the traction sheave 4 rotated by the hoisting machine M of the elevator and one ore more diverting pulleys 3. As the hoisting machine M rotates, the traction sheave 4 at the same time moves the elevator car 2 and the counterweight CW in the up direction and down direction, respectively, due to friction. In addition, in high-rise buildings and in high-speed elevators there is a second roping comprising one or more a compensating ropes C, each of which being suspended to hang at its first end to the bottom end of the counterweight CW and at its second end to the bottom part of the elevator car 2, either to the car sling or to the car itself. The compensating rope C is kept taut, e.g. by means of compensating pulleys 5, under which the compensating rope C passes around and which are connected to a support structure at the base of the elevator hoistway S, which support structure is not, however, shown in the figure. A travelling cable T intended for the electricity supply of the elevator car and/or for data traffic, e.g., rope condition monitoring data, is suspended to hang at its first end to the elevator car 2, e.g. to the bottom part of the elevator car 2, and at its second end to a connection point on the wall of the elevator hoistway S, which connection point is typically at the point of the midpoint or above the midpoint of the height direction of the elevator hoistway S.

FIG. 2 illustrates a preferred embodiment of the rope terminal assembly 1 with one wedge element 8. The rope terminal assembly 1 comprises an elevator rope R, whose width is larger than its thickness in a rope transverse direction, with the rope end comprising a first member with a first end face R' and a second member with a second end face R", a wedge element 8, and a wedge housing 7. The rope terminal assembly comprises a rope gap through which said elevator rope passes and said wedge element 8 is arranged to wedge between the first member with the first end face R' and the second member with the second end face R" of the elevator rope R thus locking said elevator rope R in the gap. The elevator rope R comprises a second member with the second end face R" comprising a separate piece of predetermined length of the elevator rope R. The second member with the second end face R" of said elevator rope R comprising a separate piece of predetermined length of said elevator rope R is clamped to the elevator rope R with clamps 9. The first member with the first end face R' and the second member with the second end face R" of said elevator rope each comprises one or more non-metallic fiber-reinforced such as carbon-fiber-reinforced polymer composite load bearing parts 11a-11d, 12a-12b, 13. The rope terminal assembly 1 comprises a wedge element 8 being an elongated element comprising a first contact surface portion arranged against said first member with the first end face R' of said elevator rope R and a second contact surface portion arranged against said second member with the second end face R" of said elevator rope R. The wedge element 8 may comprise a smooth contact surface portion or a rough or patterned contact surface portion. Advantageously, both wedge contact surface portions have equal contact surfaces with equal friction properties. The wedge element 8 may also comprise a space for the rope end block 6 at the first end of the wedge element 8. The wedge element 8 is advantageously made of metal or of some other mechanically suitable material.

FIGS. 3a and 3b illustrate an alternative preferred embodiment of the rope terminal assembly 1 with one wedge element 8. The rope terminal assembly 1 comprises an elevator rope R, whose width is larger than its thickness in a rope transverse direction, with the rope end comprising a first member with a first end face R' and a second member with a second end face R", a wedge element 8, and a wedge housing 7. The rope terminal assembly comprises a rope gap through which said elevator rope passes and said wedge element 8 is arranged to wedge between the first member with the first end face R' and the second member with the second end face R" of the elevator rope R thus locking said elevator rope R in the gap. The first member with the first end face R' and the second member with the second end face R" of the elevator rope R are integral part of said elevator rope R. As shown in FIG. 3b, the first and the second members comprise load bearing parts 11a-11d separated from each other by splitting the coating p into branches accommodating the wedge element 8. The coating p of the elevator rope R and placed on opposite sides of said wedge element 8. The outermost load bearing parts 11a, 11d are placed on opposite side of said wedge element 8 than the innermost load bearing parts 11b, 11c. The rope terminal assembly 1 comprises a wedge element 8 being an elongated element comprising a first contact surface portion arranged against said first member with the first end face R' of said elevator rope R and a second contact surface portion arranged against said second member with the second end face R" of said elevator rope R. The wedge element 8 may comprise a smooth contact surface portion or a rough or patterned contact surface portion. Advantageously, both wedge contact surface portions have equal contact surfaces with equal friction properties. The wedge element 8 may also comprise a space for the rope end block at the first end of the wedge element. The wedge element 8 is advantageously made of metal or of some other mechanically suitable material.

The rope terminal assembly 1 is fixed to the fixing base with a fixing rod being fixed through the side openings 10 of the wedge housing 7 with fixing means. It is possible for the fixing means of the fixing rod to pass through the openings 10 in the wedge housing 7.

The elevator comprises rope condition monitoring means comprising an elevator rope R electrically connected to a rope condition monitoring means via said rope end block 6 comprising one or more electrically conductive short circuit elements and fastening means, a rope condition monitoring device, which monitors and transmits an electrical signal of said elevator rope, at predefined time intervals, such as at least once per second, to an elevator controller. If an error signal is transmitted from said rope condition monitoring means to an elevator controller, the elevator operation is altered or the elevator is taken out of service. In a preferred embodiment, the rope condition monitoring means comprise a current source, a voltage measurement device, a micro-controller, and a display for monitoring condition of said ropes R.

The rope end block 6 is attached to the elevator rope R end with fastening means. It is thus possible for the fastening means to pass through the openings in the frame portion of the rope end block 6. The fastening means can advantageously be made of metal or of some other suitable electrically conductive material. The fastening means are advantageously screws or bolts with nuts. The fastening to the rope R can be done by drilling bores in the rope R and fastening with screws or bolts. The rope end block 6 comprises one or more short circuit elements attached to the rope end block 6 with fastening means. It is thus possible for the fastening means to pass through the openings in the short circuit elements. The short circuit elements such as short circuit plates as well as the fastening means are advantageously made of metal or of some other suitable electrically conductive material. Rope end block 6 is manufactured from plastics or some other electrically non-conductive material. Preferably rope end block 6 is a single piece structure manufactured from plastics, preferably from thermoplastics polymer or thermosetting polymer.

In a preferred embodiment, the rope condition monitoring means is used to measure electrical resistance between a first point and a second point of said elevator rope R, C first time during elevator installation and second time when said elevator is used for transporting passenger and/or goods. Preferably said first point and second point are points of a non-metallic load bearing part 11a-d, 12a-b, 13 of the elevator rope R, C, or points of several electrically connected non-metallic load bearing parts 11a-d, 12a-b, 13 of said elevator rope R, C.

Figure 4A:
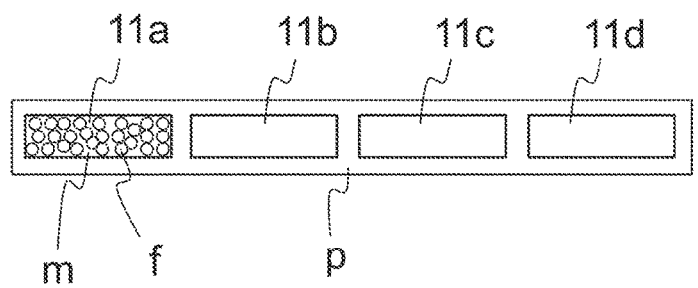
FIGS. 4a-4c illustrates the preferred alternative cross-sections for the elevator rope.
Figure 4B:
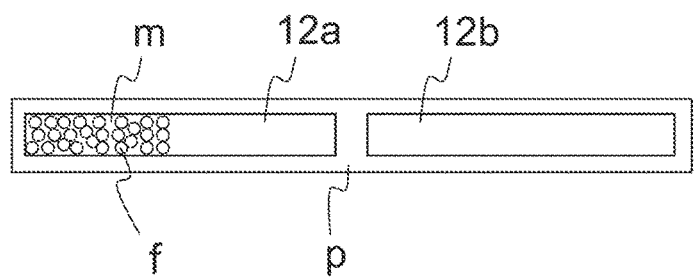
Figure 4C:
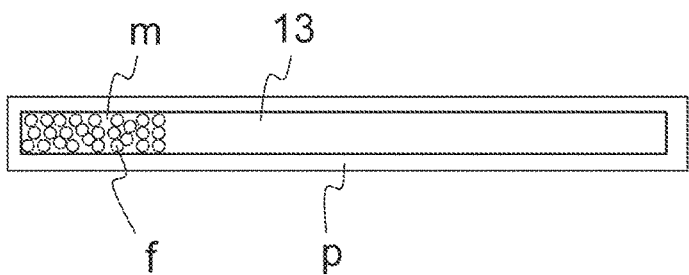

FIGS. 4a, 4b and 4c illustrates a preferred embodiment of a rope R cross section with four load-bearing parts 11a-d, two load-bearing parts 12a-b, and one load-bearing part 13, respectively, as described in connection with one of FIGS. 1-3 used as a suspension and/or transmission rope R of an elevator, particularly a passenger elevator. In the use according to the invention, at least one rope R, but preferably a number of ropes R is constructed such that the width of the rope is larger than its thickness in a transverse direction of the rope R and fitted to support and move an elevator car, said rope R comprising a load-bearing part 11a-d, 12a-b, 13 made of composite material, which composite material comprises reinforcing fibers f, which consist of untwisted unidirectional carbon-fibers, in a polymer matrix m oriented in the lengthwise direction of the rope. The suspension rope R is most preferably secured by one end to the elevator car 1 and by the other end to a counterweight CW, but it is applicable for use in elevators without counterweight as well. Although the figures only show elevators with a 1:1 suspension ratio, the rope R described is also applicable for use as a suspension rope R in an elevator with a 1:2 suspension ratio. The rope R is particularly well suited for use as a suspension and transmission rope R in an elevator having a large lifting height, preferably an elevator having a lifting height of over 100 meters, most preferably 150-800 meters. The rope R defined can also be used to implement a new elevator without a compensating rope C, or to convert an old elevator into one without a compensating rope C.

As presented in the FIGS. 4a-4c, the rope R is in the form of a belt, and thereby has a width substantially larger than the thickness thereof. This makes it well suitable for elevator use as bending of the rope is necessary in most elevators. So as to enable turning radius well suitable for elevator use, it is preferable that the width/thickness ratio of the rope is at least 2 or more, preferably at least 4, even more preferably at least 5 or more. So as to enable turning radius well suitable for elevator use, it is preferable that the width/thickness ratio(s) of said force transmission part(s) is/are at least 2, preferably at least 3 or more. When the rope R is made to contain only one load bearing member 13, then it is preferable that the ratio is 5 or more. It is preferable, that all the load bearing member(s) 11a-d, 12a-b, 13 of the rope R (irrespective whether there is only one or more of them in the rope) cover together majority, preferably 70% or over, more preferably 75% or over, most preferably 80% or over, of the width of the rope. Thus, the width of the rope is effectively utilized for the function of load bearing.

In the embodiment as illustrated in FIG. 4a and FIG. 4b, the rope R comprises a plurality of load bearing members 11a-d, 12a-b. These plural load bearing members 11a-d, 12a-b are placed adjacent each other in the width direction of the belt and on the same plane. In the embodiment as illustrated in FIG. 4c, the rope R comprises only one load bearing member 13. In both of these embodiments, the load bearing member(s) 11a-d, 12a-b, 13 is/are surrounded with a coating layer p, which layer p forms the surface of the rope protecting the load bearing member(s) 11a-d, 12a-b, 13. The layer p is preferably of polymer, most preferably of elastic polymer, such as of polyurethane, as it provides good wear resistance, protection and good friction properties, for instance for frictional traction contact with the rope wheel 4. In both of these embodiments, the load bearing member(s) 11a-d, 12a-b, 13 have a width larger than the thickness thereof as measured in width-direction of the rope R.

In this application, the term load bearing member of a rope refers to the part that is elongated in the longitudinal direction of the rope, and which part is able to bear without breaking a significant part of the load exerted on the rope in question in the longitudinal direction of the rope. The aforementioned load exerted on the rope causes tension on the load bearing member in the longitudinal direction of the load bearing member, which tension can be transmitted inside the load bearing member in question all the length of the load bearing member, e.g. from one end of the load bearing member to the other end of it.

It is obvious to a person skilled in the art that the invention is not exclusively limited to the embodiments described above, in which the invention has been described by way of example, but that many variations and different embodiments of the invention are possible within the scope of the inventive concept defined in the claims presented below. Thus it is obvious that the ropes R described may be provided with a cogged surface or some other type of patterned surface to produce a positive contact with the traction sheave 4. It is also obvious that the rectangular composite load-bearing parts 11a-d, 12a-b, and 13 may comprise edges more starkly rounded than those illustrated or edges not rounded at all. Similarly, the polymer layer p of the ropes R may comprise edges/corners more starkly rounded than those illustrated or edges/corners not rounded at all. It is likewise obvious that the load-bearing part/parts 11a-d, 12a-b, and 13 in the embodiments can be arranged to cover most of the cross-section of the rope R. In this case, the sheath-like polymer layer p surrounding the load-bearing part/parts 11a-d, 12a-b, and 13 is made thinner as compared to the thickness of the load-bearing part 11a-d, 12a-b, and 13 in the thickness-wise direction of the rope R. It is likewise obvious that, in conjunction with the solutions represented by figures, it is possible to use belts of other types than those presented. It is likewise obvious that both carbon-fiber and glass fiber can be used in the same composite part if necessary. It is likewise obvious that the thickness of the polymer p layer may be different from that described. It is likewise obvious that the shear-resistant part could be used as an additional component with any other rope structure showed in this application. It is likewise obvious that the matrix polymer in which the reinforcing fibers f are distributed may comprise—mixed in the basic matrix polymer, such as e.g. epoxy resin—auxiliary materials, such as e.g. reinforcements, fillers, colors, fire retardants, stabilizers or corresponding agents. It is likewise obvious that, although the polymer matrix preferably does not consist of elastomer, the invention can also be utilized using an elastomer matrix. It is also obvious that the fibers f need not necessarily be round in cross-section, but they may have some other cross-sectional shape. It is further obvious that auxiliary materials, such as e.g. reinforcements, fillers, colors, fire retardants, stabilizers or corresponding agents, may be mixed in the basic polymer of the layer p, e.g. in polyurethane. It is likewise obvious that the invention can also be applied in elevators designed for hoisting heights other than those considered above.

It is to be understood that the above description and the accompanying figures are only intended to illustrate the present invention. It will be apparent to a person skilled in the art that the inventive concept can be implemented in various ways. The invention and its embodiments are not limited to the examples described above but may vary within the scope of the claims.

The invention claimed is:

1. A rope terminal assembly of an elevator, the elevator configured to transport passengers and/or goods, the rope terminal assembly comprising:
  an elevator rope, the elevator rope including a width that is larger than a thickness of the elevator rope in a rope transverse direction, the elevator rope including a plurality of separate members, the plurality of separate members including a first member with a first end face and a second member with a second end face, at least a portion of the second member clamped to at least a portion of the first member;
  a wedge element;
  a wedge housing; and
  a rope gap through which the elevator rope passes and the wedge element is configured to wedge between the first member and the second member to lock the elevator rope in the rope gap,
  wherein the portion of the second member is clamped in direct contact with the portion of the first member separately from and externally to the wedge element and the wedge housing,
  wherein the rope terminal assembly is configured to be fixed to an elevator unit.

2. The rope terminal assembly according to claim 1, wherein the first member and the second member each include one or more non-metallic load-bearing parts of a plurality of non-metallic load-bearing parts, such that at least two non-metallic load-bearing parts of the plurality of non-metallic load-bearing parts are on opposite sides of the wedge element.

3. The rope terminal assembly according to claim 2, wherein the plurality of non-metallic load-bearing parts include outermost load-bearing parts and innermost load-bearing parts, the outermost load-bearing parts and the innermost load-bearing parts on opposite sides of the wedge element.

4. The rope terminal assembly according to claim 2, wherein the plurality of non-metallic load-bearing parts are coated with an elastomeric material coating, and the plurality of non-metallic load-bearing parts are separated from each other based on the elastomeric material coating being split into branches accommodating the wedge element.

5. The rope terminal assembly according to claim 1, wherein the wedge element is an elongated element including a first contact surface portion arranged against the first member and a second contact surface portion arranged against the second member.

6. The rope terminal assembly according to claim 1, wherein the wedge element includes a first contact surface and a second contact surface, the first contact surface and the second contact surface arranged against the elevator rope, the first contact surface and the second contact surface associated with an equal friction property.

7. The rope terminal assembly according to claim 1, wherein the wedge housing is symmetrical with respect to a longitudinal axis of the wedge housing.

8. The rope terminal assembly according to claim 1, further comprising:

a rope end block attached to at least one end of the elevator rope, the rope end block attached on a side of the first end face of the first member with respect to the wedge element.

9. The rope terminal assembly according to claim 8, wherein the rope end block includes an electrically non-conductive material.

10. An elevator configured to transport passengers and/or goods, the elevator comprising:
   a hoistway;
   at least one elevator unit movable in the hoistway, the at least one elevator unit including an elevator car; and
   a lifting device; and
   the rope terminal assembly according to claim 1, wherein the rope terminal assembly is fixed to the at least one elevator unit.

* * * * *